(12) United States Patent
Lin et al.

(10) Patent No.: US 8,713,096 B2
(45) Date of Patent: Apr. 29, 2014

(54) STATE CONTROL OF REMOTE HOSTS FOR MANAGEMENT OF DISTRIBUTED APPLICATIONS

(75) Inventors: Yi Lin, Bellevue, WA (US); Pavel A. Dournov, Sammamish, WA (US); Anil Ingle, Woodinville, WA (US); Frederick J. Smith, IV, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 13/104,582

(22) Filed: May 10, 2011

(65) Prior Publication Data

US 2012/0290706 A1 Nov. 15, 2012

(51) Int. Cl.
*G06F 15/16* (2006.01)
(52) U.S. Cl.
USPC .......................................... 709/203; 709/224
(58) Field of Classification Search
USPC ........................................ 709/203, 223–224
See application file for complete search history.

(56) References Cited

U.S. PATENT DOCUMENTS

| | | | |
|---|---|---|---|
| 7,428,559 B2 * | 9/2008 | Hill et al. ............................... | 1/1 |
| 7,490,317 B1 * | 2/2009 | Hahn et al. .................... | 717/121 |
| 7,778,972 B1 * | 8/2010 | Cormie et al. ................ | 707/626 |
| 2003/0088659 A1 | 5/2003 | Susarla | |
| 2006/0221720 A1 | 10/2006 | Reuter | |
| 2009/0276771 A1 | 11/2009 | Nickolov | |
| 2010/0005103 A1 | 1/2010 | Hager | |
| 2010/0325196 A1 * | 12/2010 | Beckman et al. ............. | 709/203 |

OTHER PUBLICATIONS

Albrecht, et al., "Remote Control: Distributed Application Configuration, Management, and Visualization with Plush," Nov. 2007, pp. 1-16, http://cseweb.ucsd.edu/~snoeren/papers/plush-lisa07.pdf.
Berghoff, et al., "Agent-based configuration management of distributed applications," Proceedings,Third International Conference on Configurable Distributed Systems, 1996. pp. 52-59, http://ieeexplore.ieee.org/Xplore/login.jsp?url=http%3A%2F%2Fieeexplore.ieee.org%2Fstamp%2Fstamp.jsp%3Ftp%3D%26arnumber%3D509346&authDecision=-203.
Stinson, "Azure: Fabric Controller," Blog, Oct. 15, 2009, http://lizstinson.blogspot.com/2009/10/azure-fabric-controller.html.
Vasters, "Cloud Architecture: The Scheduler-Agent-Supervisor Pattern," Blog, Sep. 28, 2010, http://vasters.com/clemensv/2010/09/28/Cloud+Architecture+The+SchedulerAgentSupervisor+Pattern.aspx.
MSDN, "Introduction to Windows Azure Platform," Retrieved Oct. 22, 2010, http://msdn.microsoft.com/en-us/library/ff803364.aspx.

* cited by examiner

*Primary Examiner* — Jason Recek
(74) *Attorney, Agent, or Firm* — Jim Sfekas; Alin Corie; Micky Minhas (57) ABSTRACT

Configuring a node. A method includes determining a current state of a target node. The current state of the target node refers to objects currently deployed or running in the remote target node. It includes at least one of an operating system, one or more applications, or configuration setting at the target node. The method further includes determining a desired state for the target node to change the current state. The method further includes accessing a dependency graph based on the version of an agent running on the target node. The dependency graph is supplied to a state machine. The state machine is particular to the target node. The state machine using the current state of the target node, the desired state and the dependency graph, performs operations to drive the target node toward its goal.

23 Claims, 6 Drawing Sheets

STATE CONTROL OF REMOTE HOSTS FOR MANAGEMENT OF DISTRIBUTED APPLICATIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnecting computer systems allow for applications to be distributed across one or more networks, which allow multiple systems to be leveraged and used efficiently. An agglomeration of networks may be referred to as the "cloud" and using such distributed resources may be referred to as "cloud computing." Large datacenters that compose the cloud share compute infrastructure including multiple connected nodes (e.g. servers) that are controlled in a coordinated fashion for deployment and management of the distributed applications that are hosted on this shared infrastructure.

The nodes are independent remote objects whose state is a complex vector that includes, for example, the file images deployed on a node, the software packages started on the node, the virtual machines implemented on the node, user applications deployed on the node, etc. The full state of the nodes may be determined by the applications allocated to the nodes, the system software that is required to run the applications, and various configuration settings for the node. The desired state of the node can change at any point based on a customer or an operator wanting to access a node in a fashion that seeks changes to the set of applications, configurations, or system software allocated to the node. The state of the nodes can change independently of a node controller or other nodes due to hardware of software failures. In addition, there may be logical and physical dependencies between the parts of the node state that prescribe a certain sequence of changes that are allowed to achieve the desired state.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a distributed computing environment. The distributed computing environment includes a plurality of nodes. The nodes include functionality for running various applications to service clients in the distributed computing environment. The embodiment includes a method of configuring a node to service client requests. The method includes determining a current state of a target node. The current state of the target node refers to objects currently deployed or running in the remote target node. It may include at least one of an operating system, one or more applications, or configuration setting at the target node. The method further includes determining a desired state for the target node. The desired state refers to objects to be deployed or run in the remote target node. It includes at least one of an operating system, one or more applications, or configuration setting desired for the target node to service a client request. The method further includes accessing a dependency graph based on the version of an agent running in the target node. The dependency graph is supplied to a state machine. The state machine is particular to the target node. The state machine using the current state of the target node, the desired state and the dependency graph, performs operations to drive the target node toward its goal (i.e., its current state is driven to match its desired state finally).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may include functionality for controlling states of nodes in a distributed computing environment while both the desired state of a given node and the current state of the given node can change at any point. Additional details are disclosed with reference to FIG. 1. In particular, embodiments may implement one or more node state drivers (referred to herein generally as 102, but shown specifically in FIG. 1 as 102-1, 102-2, 102-3 and 102-n, where the ellipses between 102-3 and 102-n indicate that any appropriate number of node state drivers 102 may be implemented).

Figure 1:
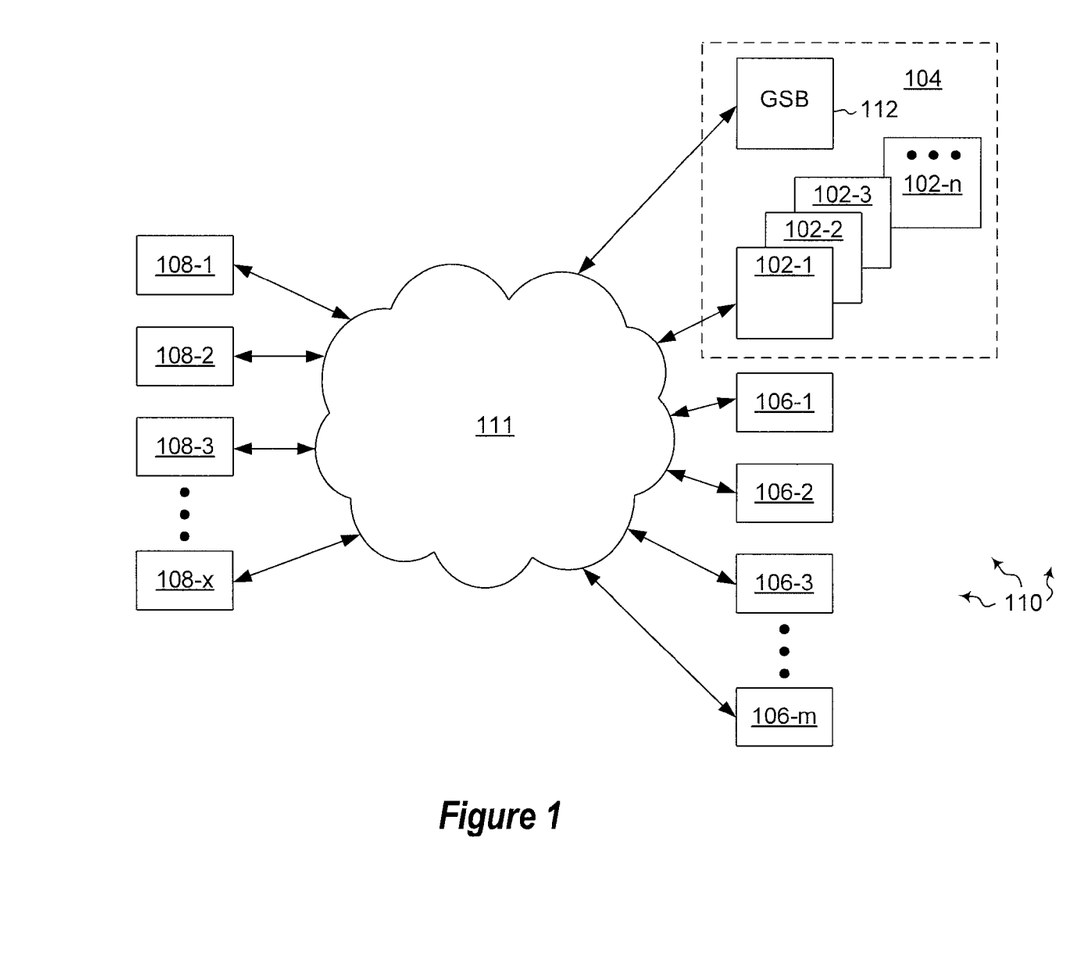
FIG. 1 illustrates an example distributed computing environment.

The node state drivers 102 are components of the fabric controller 104. The fabric controller 104 is responsible for continuous state control of the nodes (referred to herein generally as 106, but shown with specificity as 106-1, 106-2, 106-3, and 106-$m$, where the ellipses between 106-3 and 106-$m$ indicate that any appropriate number of nodes 106 may be implemented). Nodes may be any of a number of different machines. For example, nodes may be machines that run user code. Alternatively or additionally, nodes may be machines that are used in network monitoring and control, such as load balancers, aggregation switches etc.

The nodes 106 host applications for cloud computing. For example, the nodes 106 may be servers hosting applications, including having appropriate files, software packages, virtual machines, configuration settings, etc., one or more of which may define the state of a node. It may be desirable to put one or more nodes 106 into a particular state as a result of a request by a client (referred to herein generally as 108, but shown specifically in FIG. 1 as 108-1, 108-2, 102-8 and 108-$x$, where the ellipses between 108-3 and 108-$x$ indicate that any appropriate number of node clients 108 may be implemented). The client 108 may request functions be performed by a cloud computing system 110 (sometimes illustrated herein by example as a datacenter) connected to a network 111.

The node state drivers 102 monitor and maintain states of manageable entities such as physical machines, virtual machines, and application roles. Given the desired state of an entity node 106, a node state driver 102 is responsible for driving the entity node 106 to reach the desired state, by generating and executing a series of state management operations that depend on the current state of the entity node 106 and allowed operations on the entity node 106.

Figure 2:
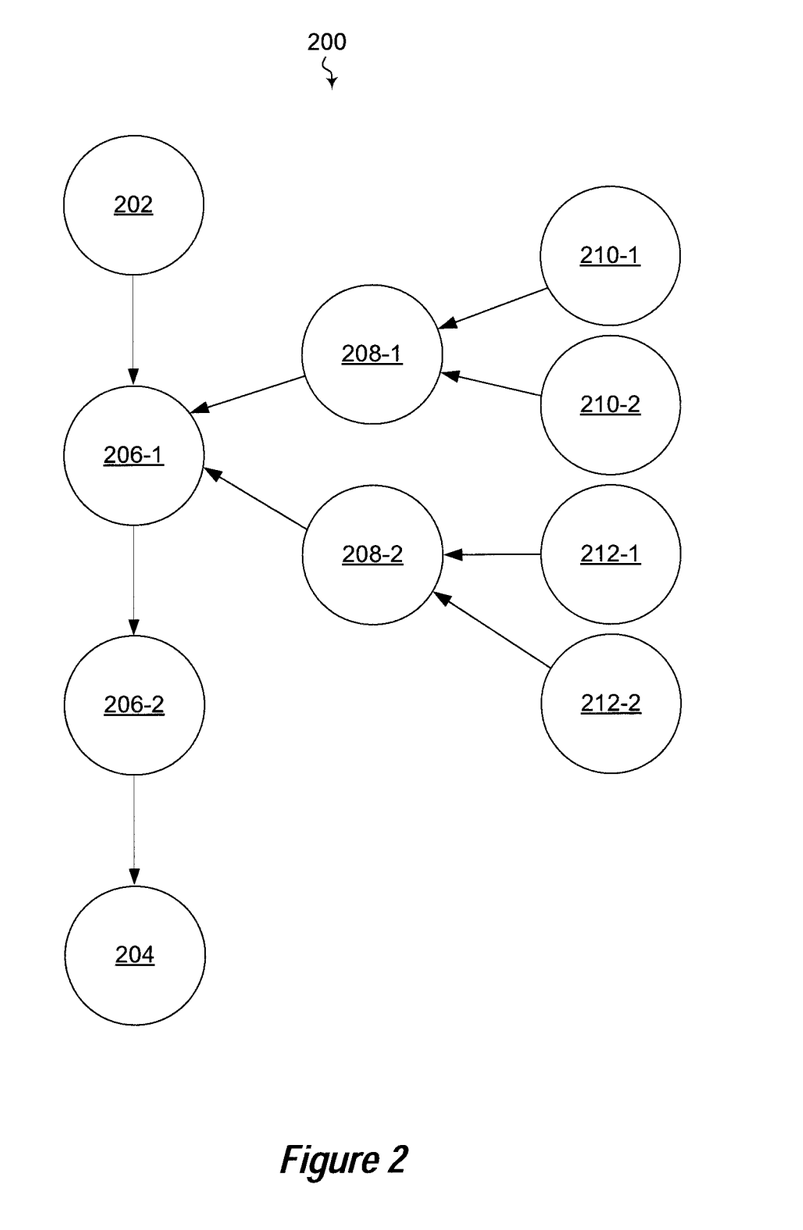
FIG. 2 illustrates an example conceptual dependency/workflow graph.

To reach the desired state, the node state driver 102 drives the entity node 106 through a set of one or more workflows. This facilitates the entity node 106 achieving parts of the desired state. Each workflow depends on the success of one or more other workflows and the current state of the entity. Referring to FIG. 2, an example of a dependency graph 200 is illustrated. The dependency graph 200 illustrates how a node 106 goes through workflows. As noted previously, several workflows may drive a node to its goal, specifically driving the current state to the desired state. Each of these workflows may be dependent on still other dependency workflows. Embodiments may use a dependency graph to resolve dependent workflows so that the actual state of a node 106 can transition from the current state to the desired state.

Illustrating now an example with respect to FIG. 2, the dependency graph 200 illustrates workflows needed to drive a node. FIG. 2 further illustrates intermediate workflows 206-1 and 206-2. The intermediate workflows may have dependency workflows. In the illustrated example, intermediate workflow 206-1 has dependency workflows 208-1 and 208-2.

Further, dependency workflows may have yet further dependency workflows. For example, dependency workflow 208-1 has dependency workflows 210-1 and 210-2. Dependency workflow 208-2 has dependency workflows 212-1 and 212-2.

Illustrating now an example of how a node 106 would move through all workflows to reach its goal (i.e. the desired state), the node state driver 102 determines that the node 106 should move from the first workflow 202 to an intermediary workflow 206-1. However, to move to the intermediate workflow 206-1, the node 106 must first apply workflows 208-1 and 208-2. Further, to apply workflow 208-1, the node must first apply workflows 210-1 and 210-2. To apply workflow 208-2, the node 106 must apply workflows 212-1 and 212-2. The node state driver 102 can facilitate a node 106 working through workflows 210-1 and 210-2 to get to workflow 208-1, and working through workflows 212-1 and 212-2 to get to workflow 208-2. The node state driver 102 can further facilitate a node 106 working through workflows 208-1 and 208-2 to get to workflow 206-1. The node state driver 102 can further facilitate working through workflow 206-1 to get to workflow 206-2. Finally, the node state driver 102 can facilitate working through workflow 206-2 to get the last workflow 204.

As noted previously, embodiments are able to handle dynamic changes to a current state and/or changes to a desired state as a node 106 progresses towards its goal to be able to handle a user request from a client 108. For example, a node 106, as it progresses through the dependency graph 200, may have the desired state change to accommodate some different configuration needed. However, rather than needing to re-traverse the entire dependency graph 200 due to the change in desired state, traversal can instead move to a point needed to reach the desired state. This may include moving back to an earlier location in the dependency graph 200 to resolve other required dependencies, and/or other appropriate actions that allow the new desired state to be achieved. For example, if a node has reached workflow 204 and the node's desired state is changed, the node needs to revisit workflows before 204. If actions in workflows 202 and 206-1 do not matter with the changes in the new desired state but 206-2 does, then the node will walk through the dependency graph from 206-2 to 204.

Similarly, a current state may change as the dependency graph 200 is being traversed. To accommodate these changes, traversal can revert to the first workflow to account for the change. However, the entire dependency graph 200 does not necessarily need to be re-traversed, but rather traversal of the dependency graph, and applying states can be performed based on what changes to state need to be made. This could be done in a fashion similar to that illustrated above in the example where a new desired state is desired.

Node state driver 102 monitors the current state of an entity node 106, thus implementing a resilient workflow control feedback loop, and determines how and when to move the entity node 106 from one workflow to another (e.g. through the dependency graph 200), and finally drives the entity node 106 to the final state (e.g. the desired state) as desired.

Node state driver 102 is unique in the way it drives entities to achieve the final desired states. Node state driver 102 allows a specification of a list of workflows which the final desired state depends on, thus allowing the flexibility to adjust the workflow transition to specific conditions of the problem.

Figure 3:
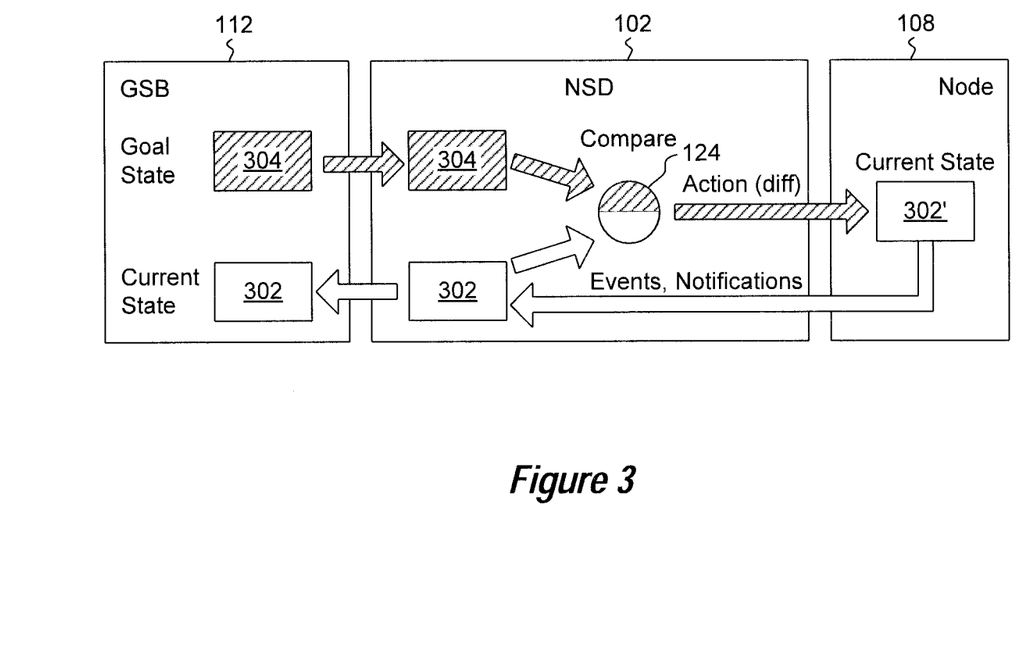
FIG. 3 illustrates interaction of a node state driver with a node.

Referring now to FIG. 3, additional details are illustrated. In particular, FIG. 3 illustrates interactions between a goal state builder 112, a node state driver 102 and a node 108. The node state driver 102 is the mechanism in the fabric controller 104 (see FIG. 1) that operates with the individual nodes 108 in a datacenter and drives the current state of the nodes 108 to the desired state created by the goal state builder 112. Various datacenter operations and customer operations result in modifications to the node goal state which is taken by the node state driver 102 for execution.

In the illustrated example, the node state driver 102 operates on two types of information the desired state 304 of the node, (in particular by operating on a snapshot of the desired state 304 which is a remote object provided by the desired state builder 112), and the current state 302 of the node, which in the illustrated example is a local cache or snapshot of the current state of the remote node 108. The node state driver 102 uses a comparison module 124 and compares the goal state 304 with the current state 302 and generates actions to adjust the state to get it to the desired state 304. The operations are carried to the remote node 108 for execution. Completion of the operations is reflected in the current state 302' of the remote node 108. As illustrated this may be performed recursively and with feedback, such that a snapshot of the current state 302' at the remote node 108 after actions have been performed is held by the node state driver 102 and becomes the new current state 302 snapshot used for subsequent comparisons and actions.

While in the example shown, a single desired state 304 and current state 302 comparison is illustrated, embodiments may divide the desired state 304 into several pieces and the current state 302 into several pieces. The pieces can then be compared as described above to facilitate moving the state of a node 106.

Figure 4:
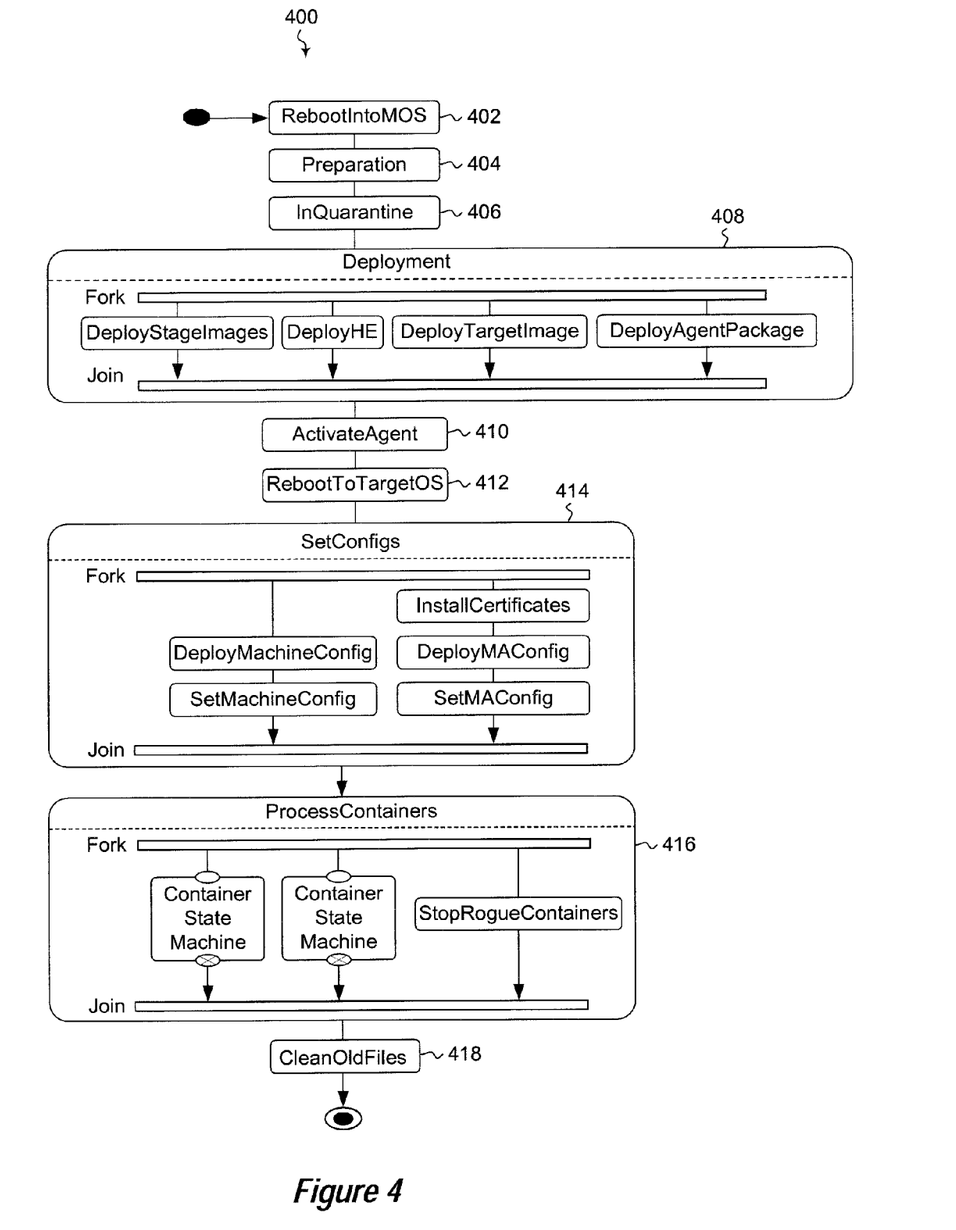
FIG. 4 illustrates an example workflow graph.

The comparison of the desired state 304 and the current state 302 is done based on a workflow graph. An example of such a workflow graph 400 is shown in FIG. 4. The workflow graph determines the sequence of steps to achieve the desired state 304 and captures the dependencies between the state transitions. Each step in the workflow is designed to: make a determination of whether or not actions should be taken; take actions; and complete actions. Should Take Action( )—compares the respective aspect of the desired state and the current state for the given node and determines whether an action needs to be taken. Take Action( )—performs the action with the remote object. Complete Action ( )—performs the necessary current state modifications upon completion of the action.

For example, FIG. 4 illustrates a number of general areas where actions should be taken shown by example as RebootintoMOS 402, Preparation 404, InQuarantine 406, Deployment 408, ActivateAgent 410, RebootToTargetOS 412, SetConfigs 414, ProcessContainers 416, and CleanOldFiles 418. These general areas are illustrated for example purposes only and may vary for different systems, but are instructive generally. The workflow graph 400 shows a number of actions to be performed and generally an order in which they are performed. For example, FIG. 4 illustrates that applications and an OS are deployed (in the Deployment area 408) before configurations are set (in the SetConfigs area 414).

Notably, while an action shows up in the workflow graph 400, it does not necessarily need to be performed. For example, if the current state 302 of a node 106 already has operating system "A" deployed and the desired state 304 specifies that operating system "A" should be deployed, then no action is necessary for that particular workflow item. Thus, embodiments can work through determining what actions need to be taken, taking actions that need to be taken, and completing taken actions as described above.

Figure 5:
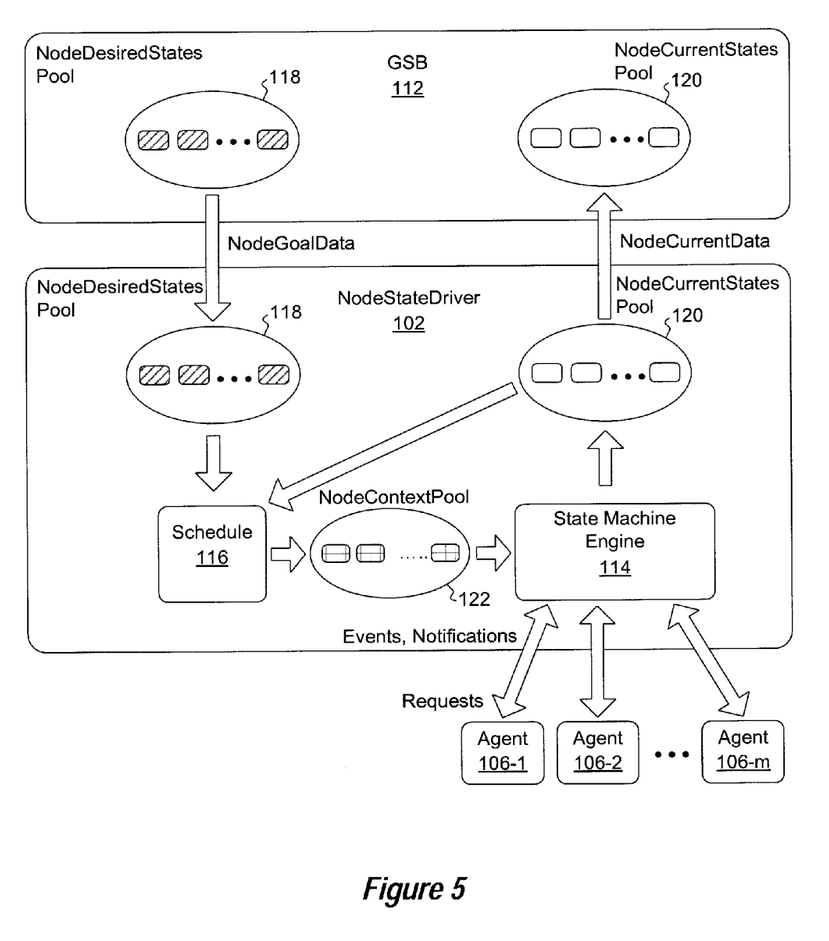
FIG. 5 illustrates a more detailed example of node state driver functionality.

Referring now to FIG. 5, the node state driver 102 includes a state machine engine 114 that operates on the workflow steps described below. The state machine engine 114 is invoked on cycles that are determined by a thread scheduler 116 based on overall system load. In each cycle the state machine engine 114 performs an operational step with a node 106. This may include multiple comparisons of the desired state 304 with the current state 302 for multiple steps if the states are not different in every aspect.

In the illustrated example, the node state driver 102 maintains three pools, NodeDesiredStates pool 118, NodeCurrentStates pool 120, and NodeContext pool 122. The NodeDesiredStates pool 118 is a pool of NodeDesiredStates snapshots in the goal state builder 112. Similarly, the NodeCurrentStates pool 120 in the goal state builder 112 is a pool of the NodeCurrentStates snapshots in node state driver 102. NodeContext pool 122 is a pool of objects to be consumed by the state machine engine 114.

These three pools are connection points between the goal state builder 112, the node state driver 102, the scheduler 116, and the state machine engine 114. The three components follow a producer-and-consumer pattern to communicate with each other.

The workflow steps are configured in the dependency graph 200 (FIG. 2), which captures the semantic and other dependencies between the workflow steps. A dependency in this graph 200 indicates that a step cannot be taken without completing the dependent workflows. Embodiments may be implemented where the dependency graph 200 is captured in separate configuration from the main state machine engine 114.

The scheduler 116 represents an optimization in the system. Given desired state and current state of nodes 106, scheduler 116 performs analysis and makes decisions of how to accelerate the state machine engine 114 to drive nodes in an efficient way. The output of the scheduler 116 is a list of NodeContext objects to be consumed by state machine engine 114. In the illustrated embodiment, the scheduler 116 does not solve correctness problems. Rather, the state machine engine 114 is responsible for ensuring correctness no matter what desired state snapshots it drives.

A thread pool in the scheduler 116, in the illustrated example, is a notification handler thread pool responsible for handling the notifications queue and fetching goal data snapshots from goal state builder 112. Notification handler threads also generate new node contexts and add them to a node contexts queue for state machine engine 114 to process. As noted, in some embodiments, at least two queues are implemented with the scheduler 116, one for notifications and the other for node contexts. Once after goal state builder 112 commits a new desired state of a node, goal state builder 112 notifies node state driver 102 by calling a scheduler notification interface with a list of notification objects. The scheduler 116 maintains notifications which have not been processed by a notification handler thread pool in a sorted queue. Each node 106 is associated with the latest notification which has not been processed. Upon receiving notifications, the scheduler 116 adds the notifications to the queue if there is no notification for their corresponding nodes, or overwrites the existing notifications otherwise. Then the scheduler 116 returns immediately to the caller, goal state builder 112. Note that if there is no notification for a node in the notification queue there are two possibilities, either the node 106 has no notifications of new desired state or the notification handler thread pool is working on the existing notification of the node 106 to get the latest desired state of the node.

The thread pool is the consumer of notifications stored in the notification queue. The thread pool continues to monitor the notification queue. It is notified once a notification is added to the queue. The thread pool makes decision on which node needs to be processed first, and then the thread pool removes the notification of the node 106 from the notification queue. In some embodiments, the decision is based on the number of new tenants (i.e. applications deployed to and controlled by the cloud computing system). Based on the needs of the customer service (based on number of roles, hosting environment/resource requirements, etc.) the fabric controller will make a decision about where to allocate the role instances of the customer service. Once these allocation decisions are made, the desired states of the target nodes are updated, and the other processes described herein are implemented to drive the node from its current state into the desired state. The following illustrates rules that may be applied: (1) nodes with new tenants have higher priority than those without new tenants; (2) if two nodes both have new tenants, they have equal priority; if a node is ranked first, all nodes of its tenants are ranked immediately after.

Having the notification of a node in hand, a notification handler thread makes decision if it should get the latest desired state snapshot of the node or not. The thread calls a synchronous interface of goal state builder 112 to get the desired state of the node 106. Once the desired state arrives, the thread creates a new node context object and inserts it to the node context queue. Then a thread pool is notified to pick up the new context to process. Note that a node context object has three types of information: (1) references to desired state and current state to make decisions to drive the node correctly; (2) reference to an interface for sending data from node state driver 102 to an agent node; and (3) the current workflows of the node and the entities in the node (its container and role instances) which tells state machines from where the entities should start and enforces correctness of a workflow sequence.

When a new workflow context is created, some embodiments will overwrite the current workflow of the entity. However, embodiments may preserve the current state of the entity (e.g., information about the entity waiting for an event and to what workflows the event corresponds, information about pending operations in an agent, etc.). The information is captured in the current state of the entity.

The node state driver 102 maintains different versions of the workflow graphs (e.g. graph 400) thus allowing for gradual upgrades of the software on the remote nodes 106 as the node state driver 102 can work with multiple versions of the remote nodes 106 at the same time.

Different instances of the node state driver 102 can run on separate machines and control subsets of the datacenter nodes 106 while still taking the desired state snapshots from a central repository, which gives a view of the datacenter as a continuous resource to the service applications.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
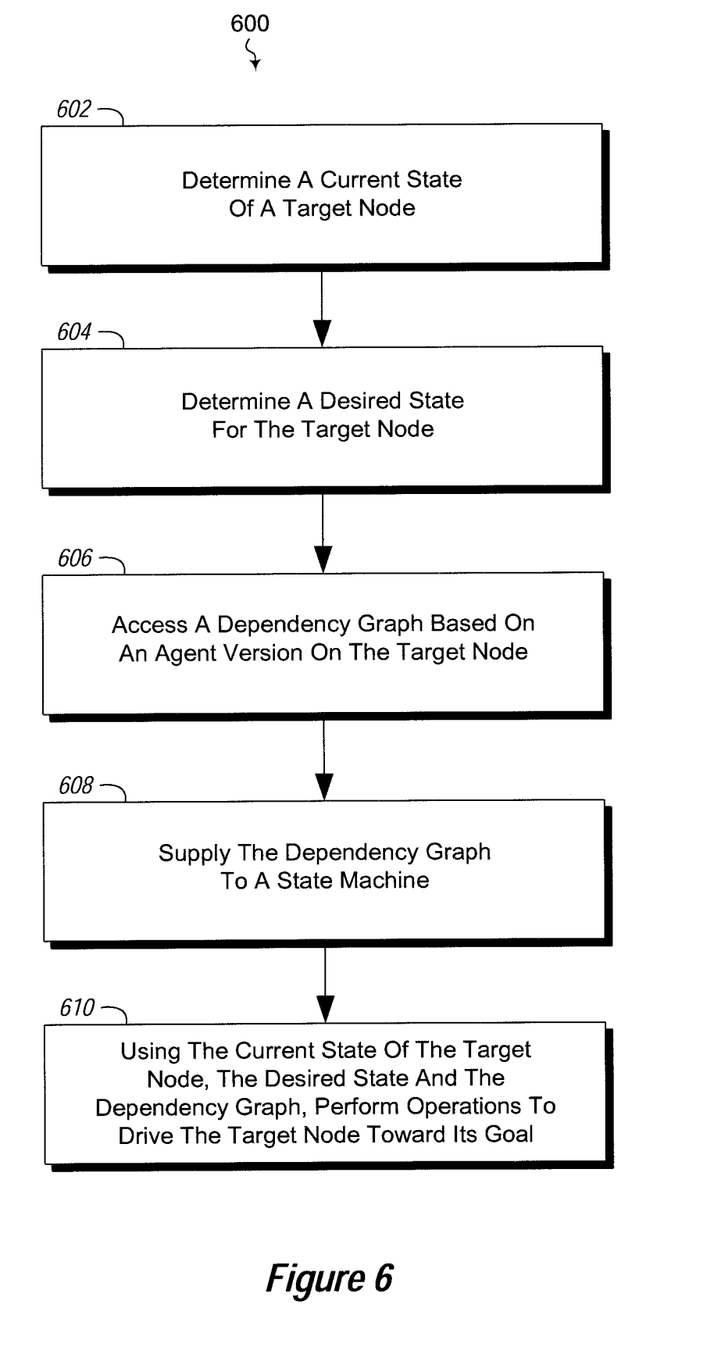
FIG. 6 illustrates a method of configuring a node.

Referring now to FIG. 6, a method 600 is illustrated. The method 600 may be practiced in a distributed computing environment. The distributed computing environment includes a plurality of nodes (e.g. nodes 106 shown in FIG. 1). The nodes can run various applications to service clients (e.g. clients 108 shown in FIG. 1) in the distributed computing environment. The method 600 includes acts for configuring a node to service client requests. The method 600 includes determining the current state of a target node (act 602). In this particular example, the current state of the target node includes at least one of an operating system, one or more applications, or configuration setting at the target node.

The method 600 further includes determining a desired state for the target node (act 604). In this particular example, the desired state includes at least one of an operating system, one or more applications, or configuration setting desired for the target node to service a client request.

The method 600 further includes accessing a dependency graph based on the desired state (act 606). FIG. 2 illustrates an example of a dependency graph in graph 200 that is dependent on the desired state 204. In some embodiments, the dependency graph is defined declaratively, such as by defining the dependency graph in a declarative language.

The method 600 further includes supplying the dependency graph to a state machine (act 608). The state machine is particular to the target node. In particular, nodes and state machines may have a one to one relationship meaning that a particular instance of a state machine is used to only drive a single node at a time. An example state machine is illustrated in the state machine engine 114.

The method 600 further includes the state machine using the current state of the target node, the desired state and the dependency graph, performing operations to drive the target node toward its goal (act 610).

In one example embodiment of method 600, the state machine using the current state of the target node, the desired state and the dependency graph, performing operations to drive the target node toward the desired state includes the state machine comparing the current state of the target node with the desired state and based on the comparison driving the target node towards its goal. FIG. 3 illustrates an example of a comparison module comparing target node current states and desired states. In some embodiments, comparing the current state of the target node with the desired state includes comparing snapshots of the current state of the target node with snapshots of the desired state. FIG. 3 and FIG. 4 illustrate the use of snapshots of current states and desired states to perform comparisons. In some embodiments, performing operations to drive the target node toward its goal is performed as part of several instances of a node state driver driving several nodes towards their goals. In some embodiments, node state driver driving several nodes towards their goals may be performed in parallel. That goal states may be rich enough to express a cross dependency between nodes in addition to specifying the particular node's ultimate state. The node state drivers may drive nodes on a one to one basis, but all of the node state drivers use a single snapshot central repository to compare target node current states with desired states. This allows for a single consistent view of a datacenter while allowing individual state machines to drive individual nodes.

In some embodiments of the method 600, the state machine using the current state of the target node, the desired state and the dependency graph, performing operations to drive the target node toward its goal includes the state machine dividing the current state of the target node into a plurality of pieces; dividing the desired state into a plurality of pieces; comparing pieces of the current state of the target node with the pieces of the desired state; and based on the comparison driving the target node.

In some embodiments of the method 600, the state machine using the current state of the target node, the desired state and the dependency graph, performing operations to drive the target node toward its goal includes the state machine iteratively progressing through the dependency graph to drive the target node toward its goal. In some embodiments, acts are performed iteratively to account for changes in the current state and the desired state, in a fashion that allows acts to be revisited if there is a change in the current state or the goal state.

Embodiments may be implemented where dependency graphs are correlated to state machines. Thus, embodiments may be implemented where a new version of the dependency graph is received, and as a result a new state machine is matched to the new version to use the new version of the dependency graph to drive the target node toward its goal.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for dynamically managing a distributed computing environment by changing the state of one or more servers which serve as target nodes in response to service requests from one or more client computer systems which access the distributed computer environment for services, the computer-implemented method comprising:

receiving within a distributed computing environment a request for services from a client computer system;

in response to the request for services, instantiating
   a state driver that determines a target node's current state, which comprises at least one of an operating system, one or more applications, or configuration setting at the target node; and
   a goal state builder that determines a new desired state that will be required to meet the request for services, which comprises altering at least one or more of the current state's operating system, one or more applications, or configuration setting;

the state driver then comparing the current state and the new desired state and generating required actions for changing the current state in order to move to the new desired state at the target node, with the required actions being represented as a dependency graph which defines a sequence for carrying out the required actions;

based on the sequence of actions represented in the dependency graph, the state driver causing each required action to be carried out until the new desired state is achieved at the target node; and using the new desired state at the target node to respond to the request for services received from the client computing system.

2. The method of claim 1, wherein if the state driver detects that the current state and/or the new desired state of the target node have changed before the actions represented by the dependency graph have been fully implemented, then the state driver and/or the goal state builder updating the current state and/or desired new state and generating any new actions required for changing the current state to the new desired state in accordance with how either or both of them have been updated, and then determining which parts of the dependency graph require the updated actions to be performed by the state driver.

3. The method of claim 1, wherein comparing the current state of the target node with the new desired state comprises comparing a snapshot of the current state of the target node with a snapshot of the new desired state.

4. The method of claim 1, wherein the acts are performed iteratively to account for changes in the current state and the new desired state, in fashion that allows acts to be revisited if there is a change in the current state or the desired state.

5. The method of claim 1, wherein the state driver uses a single snapshot central repository to compare target node current states with new desired states.

6. The method of claim 1, wherein comparing the current state and the new desired state comprises:
dividing the current state of the target node into a plurality of pieces;
dividing the new desired state into a plurality of pieces;
comparing pieces of the current state of the target node with the pieces of the new desired state.

7. The method of claim 1, wherein causing each required action to be carried out until the new desired state is achieved at the target node comprises iteratively progressing through the dependency graph.

8. The method of claim 7, further comprising receiving a new version of the dependency graph, and using the new version of the dependency graph to cause each required action of the new dependency graph to be carried out until the new desired state is achieved at the target node.

9. The method of claim 1, wherein the dependency graph is defined declaratively.

10. A computer program product comprising one or more physical memory devices which contain executable instructions which, when executed by one or more processors, cause the processors to implementing a method for dynamically managing a distributed computing environment by changing the state of one or more servers which serve as target nodes in response to service requests from one or more client computer systems which access the distributed computer environment for services, the implemented method comprising:
receiving within a distributed computing environment a request for services from a client computer system;
in response to the request for services, instantiating
a state driver that determines a target node's current state, which comprises at least one of an operating system, one or more applications, or configuration setting at the target node; and
a goal state builder that determines a new desired state that will be required to meet the request for service, which comprises altering at least one or more of the current state's operating system, one or more applications, or configuration setting;
the state driver then comparing the current state and the new desired state and generating required actions for changing the current state in order to move to the new desired state at the target node, with the required actions being represented as a dependency graph which defines a sequence for carrying out the required actions;
based on the sequence of actions represented in the dependency graph, the state driver causing each required action to be carried out until the new desired state is achieved at the target node; and
using the new desired state at the target node to respond to the request for services received from the client computing system.

11. The computer program product of claim 10, wherein if the state driver detects that the current state and/or the new desired state of the target node have changed before the actions represented by the dependency graph have been fully implemented, then the state driver and/or the goal state builder updating the current state and/or desired new state and generating any new actions required for changing the current state to the new desired state in accordance with how either or both of them have been updated, and then determining which parts of the dependency graph require the updated actions to be performed by the state driver.

12. The computer program product of claim 10, wherein comparing the current state of the target node with the new desired state comprises comparing a snapshot of the current state of the target node with a snapshot of the new desired state.

13. The computer program product of claim 10, wherein the acts are performed iteratively to account for changes in the target node current state and the new desired state, in fashion that allows acts to be revisited if there is a change in the target node current state or the desired state.

14. The computer program product of claim 10, wherein the state driver uses a single snapshot central repository to compare target node current states with new desired states.

15. The computer program product of claim 10, wherein comparing the current state and the new desired state comprises:
dividing the current state of the target node into a plurality of pieces;
dividing the new desired state into a plurality of pieces;
comparing pieces of the current state of the target node with the pieces of the new desired state.

16. The computer program product of claim 10, wherein causing each required action to be carried out until the new desired state is achieved at the target node comprises iteratively progressing through the dependency graph.

17. The computer program product of claim 16, further comprising receiving a new version of the dependency graph, and using the new version of the dependency graph to cause each required action of the new dependency graph to be carried out until the new desired state is achieved at the target node.

18. The computer program product of claim 10, wherein the dependency graph is defined declaratively.

19. The computer program product of claim 10, wherein the act of receiving the request for services from the client computer system and the act of instantiating the state driver and goal state builder are performed at least partially by at least one server system in the distributed computing environment.

20. A computer system for dynamically changing the state of at least one server which serves as a target node in a distributed computing environment, the system comprising:
one or more processors; and
one or more physical memory devices which contain executable instructions which, when executed by the one or more processors, cause the processors to implement a method for dynamically changing the state of the target node in response to a service request from a client computer system which accesses the distributed computer environment for services, the implemented method comprising:
in response to the service request, instantiating
a state driver that determines a target node's current state, which comprises at least one of an operating system, one or more applications, or configuration setting at the target node; and
a goal state builder that determines a new desired state that will be required to meet the service request, which comprises altering at least one or more of the current state's operating system, one or more applications, or configuration setting;

the state driver then comparing the current state and the new desired state and generating required actions for changing the current state in order to move to the new desired state at the target node, with the required actions being represented as a dependency graph which defines a sequence for carrying out the required actions;

based on the sequence of actions represented in the dependency graph, the state driver causing each required action to be carried out until the new desired state is achieved at the target node;

if the state driver detects that the current state and/or the new desired state of the target node have changed before the actions represented by the dependency graph have been fully implemented, then the state driver and/or the goal state builder updating the current state and/or desired new state and generating any new actions required for changing the current state to the new desired state in accordance with how either or both of them have been updated, and then determining which parts of the dependency graph require the updated actions to be performed by the state driver; and using the new desired state at the target node to respond to the request for services received from the client computing system.

21. The system of claim 20, wherein comparing the current state of the target node with the new desired state in the implemented method comprises comparing a snapshot of the current state of the target node with a snapshot of the new desired state.

22. The computer program product of claim 19, wherein the at least one server system is the target node.

23. The computer program product of claim 19, wherein the target node completely performs the act of receiving the request for services from the client computer system and the acts of instantiating the state driver and goal state builder.

* * * * *